(12) United States Patent
Guida (10) Patent No.: US 6,774,539 B2
(45) Date of Patent: Aug. 10, 2004

(54) HIGH PRESSURE, HIGH SPEED ACTUATOR

(75) Inventor: Renato Guida, Wynantskill, NY (US)

(73) Assignee: Lockheed Martin Corporation, Bethesda, MD (US)

(*) Notice: Subject to any disclaimer, the term of this patent is extended or adjusted under 35 U.S.C. 154(b) by 0 days.

(21) Appl. No.: 10/252,886

(22) Filed: Sep. 23, 2002

(65) Prior Publication Data

US 2004/0056565 A1 Mar. 25, 2004

(51) Int. Cl.⁷ .......................... H01L 41/08; H02N 2/04
(52) U.S. Cl. ............................................... 310/328
(58) Field of Search ........................................ 310/328

(56) References Cited

U.S. PATENT DOCUMENTS

| | | | | |
|---|---|---|---|---|
| 1,766,044 A | * | 6/1930 | Nicolson | 381/190 |
| 5,942,837 A | * | 8/1999 | Reuter | 310/328 |
| 6,040,653 A | * | 3/2000 | O'Neill | 310/328 |

FOREIGN PATENT DOCUMENTS

| | | | | |
|---|---|---|---|---|
| DE | 3626507 | * | 2/1987 | 310/311 |
| JP | 57-137980 | * | 11/1982 | 310/328 |
| JP | 62-272575 | * | 11/1987 | H01L/41/08 |
| JP | 3-234981 | * | 10/1991 | |
| JP | 4-38177 | * | 2/1992 | H01L/41/09 |
| JP | 5-304323 | * | 11/1993 | H01L/41/09 |
| JP | 10-14262 | * | 1/1998 | H02N/2/00 |

* cited by examiner

Primary Examiner—Thomas M. Dougherty
(74) Attorney, Agent, or Firm—Scully, Scott, Murphy & Presser (57) ABSTRACT

An actuator for applying an actuating force through a total displacement. The actuator includes: an actuator body; n piezo members supported by the body where n is an integer greater than or equal to two, each of the piezo members generating a force and a displacement upon application of a voltage thereon; and n−1 levers rotatably disposed in the body and each having first and second ends corresponding to two of the n piezo members such that the displacements of the n piezo members are accumulated to generate the total displacement at the nth piezo member. Preferably, at least one of the n−1 levers are rotatably disposed in the body such that the displacement from one of the n piezo members acting on the first end of the at least one of the n−1 levers is amplified at the second end of the at least one of the n−1 levers.

17 Claims, 6 Drawing Sheets

HIGH PRESSURE, HIGH SPEED ACTUATOR

BACKGROUND OF THE INVENTION

1. Field of the Invention

The present invention relates generally to actuators, and more particularly, to actuators capable of generating high pressure at a high operating frequency.

2. Prior Art

Commercial valves for high pressure and high flow rate are typically very large and have a low operating frequency (cycle). On the contrary, valves having fast operating frequencies are known in the art for low pressure and low flow rates. Such valves are typically very small in size (e.g., MEMS actuators). Presently, electromagnetic valves can meet some high pressure/flow specification and can also have relatively fast operating frequencies if complex techniques are employed. However, such techniques come at the expense of size and power. Therefore, electromagnetic valves are very bulky and expensive.

Therefore, there is a need in the art for a valve actuator which operates at high pressure and flow as well as a fast operating frequency that is less bulky and expensive than the valve actuators of the prior art.

SUMMARY OF THE INVENTION

Therefore it is an object of the present invention to provide an actuator that is capable of use on high pressure and high flow valves that is less bulky than similar use valve actuators of the prior art.

It is another object of the present invention to provide an actuator that is capable of use on high pressure and high flow valves that is less expensive than similar use valve actuators of the prior art.

It is still a further object of the present invention to provide an inexpensive and small actuator that can apply a relatively large force through a relatively large displacement.

Accordingly, an actuator for applying an actuating force through a total displacement is provided. The actuator comprises: an actuator body; n piezo members supported by the body where n is an integer greater than or equal to two, each of the piezo members generating a force and a displacement upon application of a voltage thereon; and n−1 levers rotatably disposed in the body and each having first and second ends corresponding to two of the n piezo members such that the displacements of the n piezo members are accumulated to generate the total displacement at the nth piezo member.

Preferably, at least one of the n piezo members comprises a plurality of sheet elements of a piezo material stacked upon each other to form a piezo stack. Alternatively, at least one of the n piezo members is a solid bar of a piezo material.

The actuator preferably further comprises a rotatable joint between each of the first and second ends of at least one of the n−1 levers and a portion of each corresponding piezo member. Each rotatable joint preferably comprises: the piezo member corresponding to the at least one lever having an end portion; a cap plate disposed on the end portion, the cap plate having a concavity formed thereon; the lever having a concavity formed on one of the first and second ends corresponding to the piezo member; and a ball disposed in the concavities of the cap plate and lever for providing a relative rotation therebetween.

The body preferably comprises first and second end plates having a pair of aligned bores corresponding to each of the n−1 levers, each of the n−1 levers having a shaft rotatably disposed in the pair of aligned bores.

Preferably, at least one of the n−1 levers are rotatably disposed in the body such that the displacement from one of the n piezo members acting on the first end of the at least one of the n−1 levers is amplified at the second end of the at least one of the n−1 levers.

Each of the piezo members preferably have corresponding first and second ends and the n−1 levers are disposed in an alternating manner at the first and second ends between adjacent piezo members.

More specifically, an actuator for applying an actuating force through a total displacement is provided where the actuator comprises: an actuator body; a first piezo member having a first end fixed to the body and a second free end, the first piezo member generating a first force and a first displacement upon application of a first voltage thereon; a second piezo member supported in the body and having first and second free ends, the second piezo member generating a second force and a second displacement upon application of a second voltage thereon; and a first lever rotatably disposed in the body and having a first end corresponding to the second free end of the first piezo member and a second end corresponding to the second free end of the second piezo member such that the first and second displacements of the first and second piezo members are accumulated to generate the total displacement at the first free end of the second piezo member.

The actuator preferably further comprises: a third piezo member supported in the body and having first and second free ends, the third piezo member generating a third force and a third displacement upon application of a third voltage thereon; and a second lever rotatably disposed in the body and having a first end corresponding to the first free end of the second piezo member and a second end corresponding to the first free end of the third piezo member such that the first, second and third displacements of the first, second and third piezo members are accumulated to generate the total displacement at the second free end of the third piezo member.

Preferably, the first lever is rotatably disposed in the body such that the displacement from the first piezo member acting on the first end of the first lever is amplified at the second end of the first lever and/or the second lever is rotatably disposed in the body such that the displacement from the second piezo member acting on the first end of the second lever is amplified at the second end of the second lever.

At least one of the first and second piezo members preferably comprises a plurality of sheet elements of a piezo material stacked upon each other to form a piezo stack. Alternatively, at least one of the first and second piezo members is a solid bar of a piezo material.

The actuator preferably further comprises a rotatable joint between the first end of the first lever and the second free end of the first piezo member and between the second end of the first lever and the second free end of the second piezo member. Preferably, each of the rotatable joints comprises: a first cap plate disposed on the second fee end of the first piezo member and a second cap plate disposed on the second free end of the second piezo member, the first and second cap plates having a concavity formed thereon; the first and second ends of the first lever having a concavity formed thereon and corresponding to the concavity on the first and second cap plates; and a first ball disposed in the concavities of the first cap plate and the first end of the first lever and a second ball disposed in the concavities of the second cap plate and second end of the first lever.

Preferably, the body comprises first and second end plates having a pair of aligned bores, the first lever having a shaft rotatably disposed in the pair of aligned bores.

Still further provided is a method for actuating a force through a total displacement. The method comprising: providing two or more piezo members supported in a body, each of the two or more piezo members generating a force and a displacement upon application of a voltage thereon; and accumulating the displacements of the two or more piezo members to generate the total displacement.

The method preferably further comprises amplifying at least one of the displacements from the two or more piezo members.

BRIEF DESCRIPTION OF THE DRAWINGS

These and other features, aspects, and advantages of the apparatus and methods of the present invention will become better understood with regard to the following description, appended claims, and accompanying drawings where:

DETAILED DESCRIPTION OF THE PREFERRED EMBODIMENT

Although this invention is applicable to numerous and various types of actuators, it has been found particularly useful in the environment of a valve actuator. Therefore, without limiting the applicability of the invention to valve actuators, the invention will be described in such environment.

Figure 1:
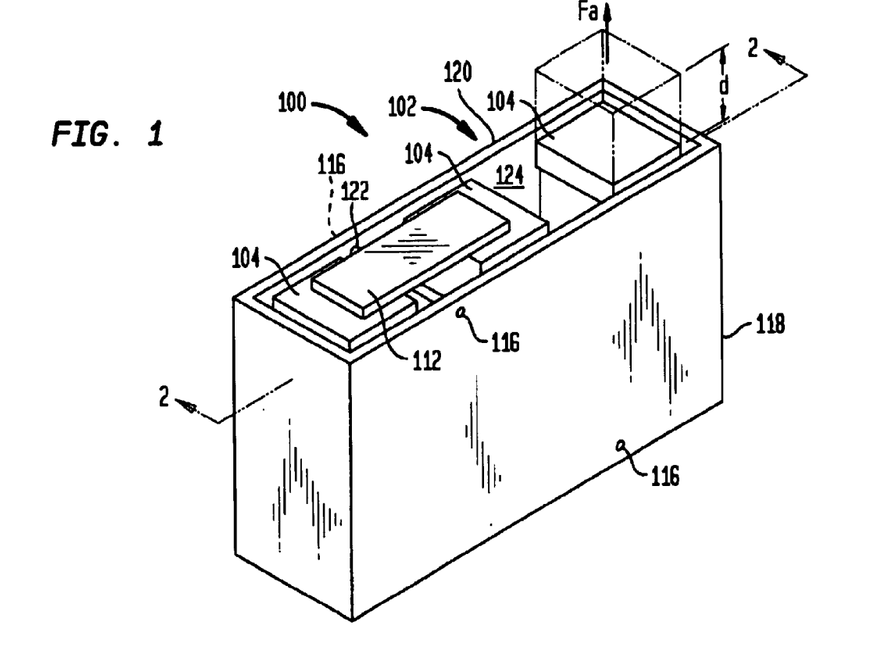
FIG. 1 illustrates a perspective view of a first preferred implementation of an actuator of the present invention having an-in-line configuration of piezo members.
Figure 2:
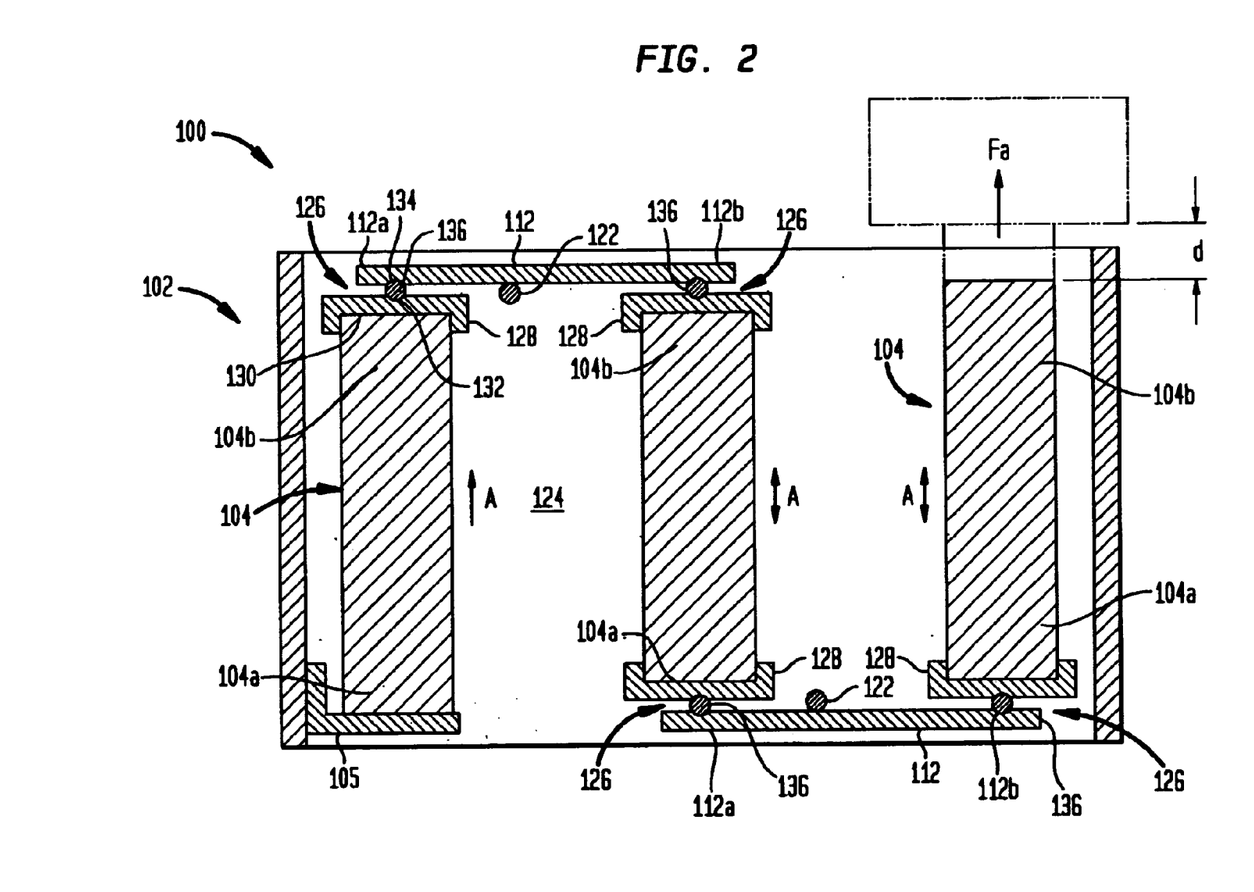
FIG. 2 illustrates a sectional view of the actuator of FIG. 1 as taken along line 2—2 in FIG. 1.

Referring now to FIGS. 1 and 2, a first preferred implementation of an actuator for applying an actuating force $F_a$ through a total displacement d is shown, the first preferred implementation of the actuator being generally referred to by reference numeral 100. The force $F_a$ and total displacement d are transferred to or generally acts upon another device 101, shown in phantom lines. The device 101 is preferably a valve or other similar device. The actuator 100 includes an actuator body 102. The actuator body 102 is preferably fabricated from metallic materials, including steel and aluminum, but may also be fabricated from polymers and composites. The actuator body 102 is further preferably of a unitary construction, but may also be constructed from individual panels.

The actuator 100 further has piezo members 104 supported by the actuator body 102. Although three such piezo members 104 are shown in FIG. 1, such is shown by way of example only and not to limit the scope or spirit of the present invention. Those skilled in the art will appreciate that two or more piezo members 104 can be utilized in the actuators 100 of the present invention. Furthermore, the piezo members 104 are shown in an in-line configuration by way of example only and not to limit the scope and spirit of the present invention. Those skilled in the art will appreciate that other configurations are possible, for example, the piezo members 104 can be arranged in a rectangular (or wrap-around) configuration as will be discussed below with regard to FIG. 3. One of the piezo members 104 is fixed to the body 102, such as by a support plate 105 rigidly fixed to the body 102, such as by welding or with fasteners (not shown). The first piezo member 104 is then fixed to the support plate 105, by any means known to those skilled in the art. Furthermore, the body 102 and piezo members 104 may have a means (not shown) for restraining the motion of the piezo members 104 relative to the body 102 to only one direction, e.g., direction of arrow A. Such means may be a pin (not shown) provided in each piezo member 102 which is sliding disposed in slot (not shown) which is elongated in the direction of arrow A. As can be seen from FIG. 2, the first piezo member 104, because it has a fixed end to the body 102, is restrained to only move in the upward direction of arrow A, while the other piezo members 104 can move in both directions of arrow A.

Figure 5A:
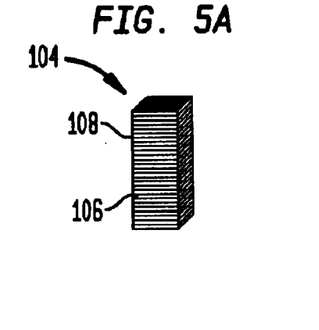
FIGS. 5A and 5B illustrate the piezo members of FIG. 1 or 3 having laminated stack and solid bar configurations, respectively.
Figure 5B:
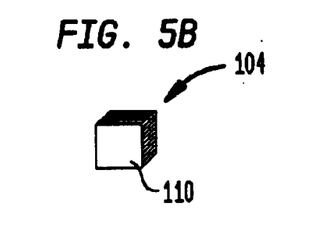

Referring briefly to FIGS. 5A and 5B, there are shown two variations of the piezo members 104. FIG. 5A illustrates a first preferred implementation of the piezo members 104 having a plurality of sheet elements 106 (or laminates) of a piezo material stacked upon each other to form a piezo stack 108. FIG. 5B illustrates another preferred implementation of the piezo members 104 fabricated from a solid bar 110 of a piezo material. The piezo members 104 are commercially available in different sizes and can also be custom made to any reasonable geometrical size. An 18 mm tall piezo member 104 such as that illustrated in FIG. 5A is commercially available from Piezo System, Inc. while a 10 mm tall piezo member as illustrated in FIG. 5B is commercially available from Physikinstrumente.com. Piezo materials are well known in the art and therefore, a detailed description therefore is omitted herein. Generally, each of the piezo members generate a force and a displacement upon application of a voltage thereon. Although, the piezo members 104 illustrated in the drawings are columns having a square cross-section, such is shown by way of example only. The piezo members can be configured in any manner which applies a resultant force and displacement as discussed below, such as columns having circular or rectangular cross-sections or spheres, or spheres having truncated upper and lower surfaces.

Figure 7:
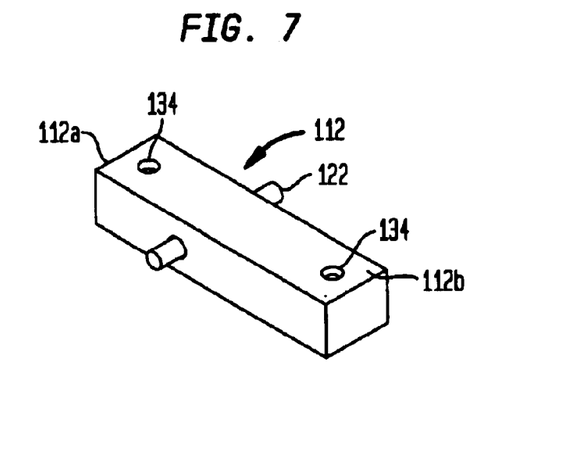
FIG. 7 illustrates a perspective view of a lever of FIG. 1 or 3.

Referring back to FIGS. 1 and 2, the actuator 100 further has levers 112, each of which is rotatably disposed in the body 102 and each lever also has first and second ends 112a, 112b corresponding to two of the piezo members 104. Generally one less lever 112 than the number of piezo members 104 are needed in the actuator 100. As will be discussed below, the levers 112 accumulate and preferably amplify the displacements of the piezo members 104 to generate a total displacement d and actuating force Fa at one of the piezo members 104 in the actuator 100. The preferred manner in which the levers 112 are rotatably supported in the body 102 comprises providing a pair of axial aligned bores 116 in first and second end plates 118, 120 of the body 102 for each lever 112. Also provided is a shaft 122 which is fixed in the lever 112 and rotatably disposed in the pair of aligned bores 116, 118, as shown in FIG. 7. Alternatively, the shaft 122 can be fixed in the aligned bores 116, 118 and rotatably disposed in the lever 112. Although, the piezo members 104 and levers 112 are illustrated as being disposed in a cavity 124 of the body 102, such is shown by way of example only and not to limit the scope and spirit of the present invention. For example, the actuator body can be a single plate from which the levers 112 are rotatably cantilevered and the piezo members 104 floating between the levers 112.

It is preferred that the levers 112 are disposed in an alternating manner between adjacent piezo members 112 at corresponding first and second ends 104a, 104b of the piezo members 104. That is, each of the first ends 104a of the piezo members are arranged on the same plane (e.g., the bottom of the actuator as illustrated) and each of the second ends 104b of the piezo members 104 are arranged in the same plane (e.g., the top of the actuator as illustrated). The levers 112 alternate between adjacent piezo members 104 at the first and second ends 104a, 104b. Therefore, a lever 112 is disposed between the second ends 104b of the center and leftmost piezo members 104 illustrated in FIG. 2 and another lever 112 is disposed between the first ends 104a of the center and rightmost piezo members 104 illustrated in FIG. 2. This alternating pattern would continue for any additional piezo members 104 in the actuator. As will discussed below with regard to FIGS. 3, 4A, and 4B, the alternating pattern would be the same even if the piezo members 104 are not configured in the in-line configuration of the actuator 100 of FIGS. 1 and 2.

As will be discussed below, preferably the levers 112 provide an amplification of a displacement from one piezo member 104 to the next or to a final displacement d. To provide such an amplification, the shaft 122 is positioned closer to the first end 112a of the lever 112 than the second end 112b. Thus, the displacement from one of the piezo members 104 acting on the first end 112a of a lever 112 is amplified at the second end 112b of the levers. One or more of the levers 112 can be so configured.

Figure 6:
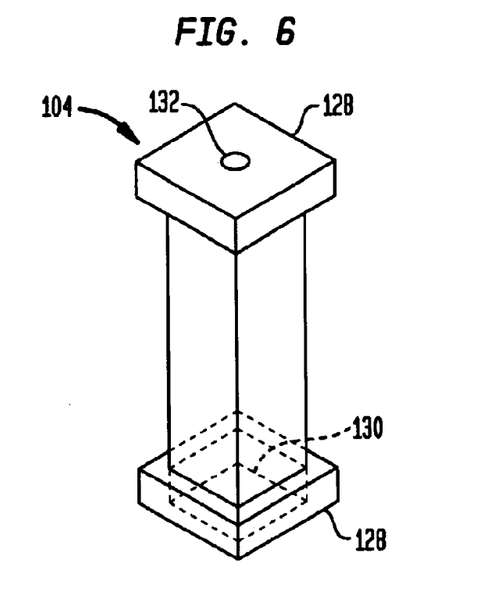
FIG. 6 illustrates a perspective view of a piezo member of FIG. 1 or 3 having end caps disposed on first and second ends thereof.

Referring now also to FIGS. 6 and 7, the actuator 100 preferably includes a rotatable joint 126 between each of the first and second ends 112a, 112b of the levers 112 and a portion of each corresponding piezo member 104. Each rotatable joint 126 preferably comprises a cap plate 128 disposed on one or both end portions of the piezo members 104. The cap plate 128 preferably has a bore 130 for accepting the corresponding end portion of the piezo member 114 and a concavity 132 formed on a surface thereof. A corresponding first and/or second end 112a, 112b, of the lever 112 has a concavity 134 formed thereon. The concavities 132, 143 are preferably semi-spherical, however other shapes are possible. A ball 136 is disposed in the concavities 132, 134 of the cap plate 128 and lever 112 for providing a relative rotation therebetween for each of the rotating joints 126.

Figure 3:
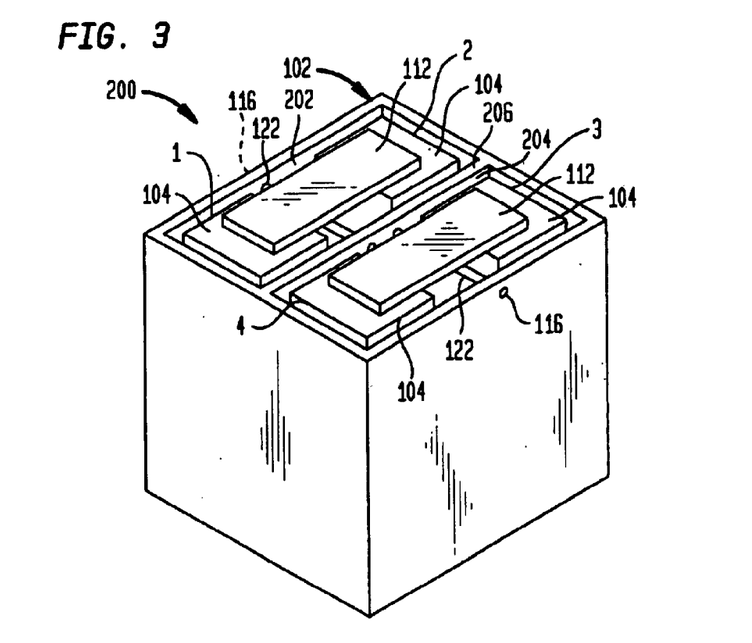
FIG. 3 illustrates a perspective view of a second preferred implementation of an actuator of the present invention having a rectangular configuration of piezo members.
Figure 4A:
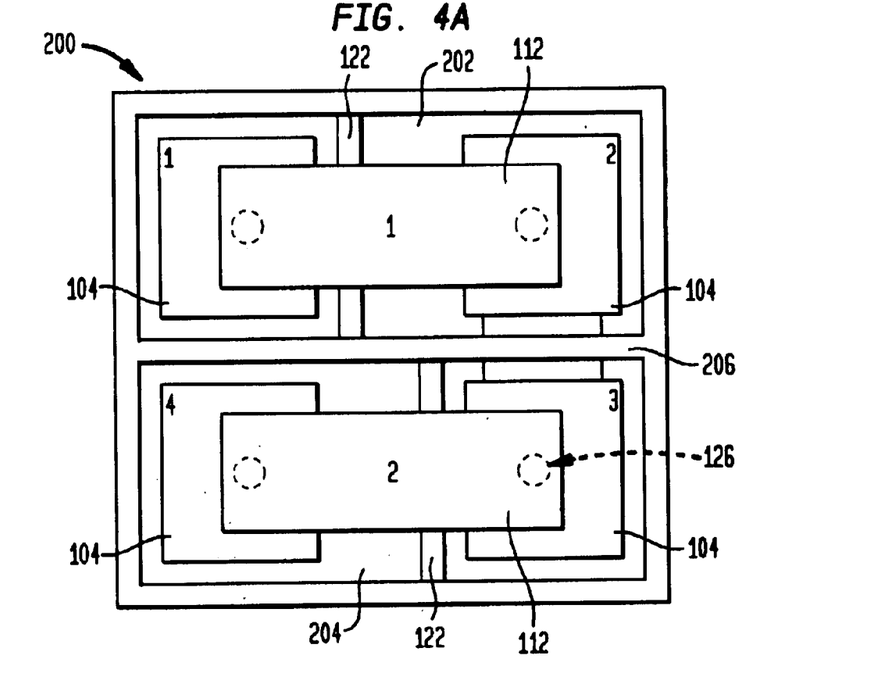
FIGS. 4A and 4B illustrate top and bottom views, respectively, of the actuator of FIG. 3.
Figure 4B:
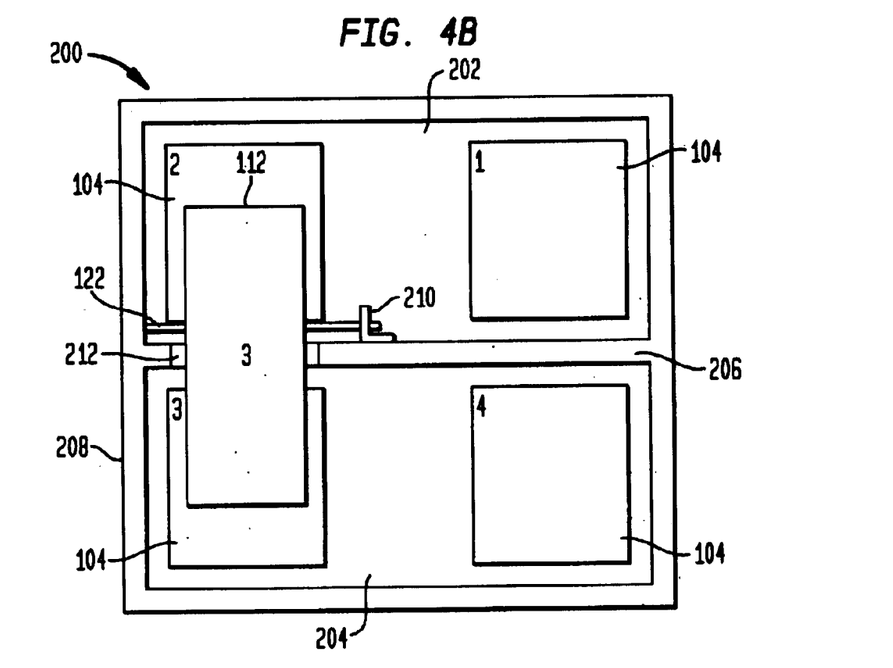

Referring now to FIGS. 3, 4A and 4B, there is shown a second preferred implementation of an actuator of the present invention in which like features are designated with like reference numerals from the first preferred implementation previously described. The second preferred implementation of the actuator of the present invention being generally referred to by reference numeral 200. Actuator 200 differs from actuator 100 in that the piezo members 104 are configured in a rectangular configuration, and more particularly in a square configuration. In the configuration of FIG. 3, the body 102 is divided into two cavities 202, 204, in each of which is disposed piezo elements similarly to that described above. Specifically, one of the piezo members 104 is fixed relative to the body 102 and the others are free to move relative to the body, preferably restrained to travel along a single axis as discussed above. The levers 112 are similarly configured to those described above, specifically, the levers 112 include a shaft 122 which is disposed in axially aligned bores 116, 118 in side plates 118, 120 of the body and additionally in a center plate 206. As can be seen from FIGS. 3 and 4A, a lever 112 is disposed between the piezo members in each of the cavities 202, 204, preferably with the rotating joints 126 as described above. As can be seen in FIG. 4B, another lever is disposed between adjacent piezo members 104 of the two cavities 202, 204. The lever 112 disposed between the cavities 202, 204 is preferably rotatably disposed in axial bores in an end plate 208 and a bushing plate 210 fixed to the center plate 206. Furthermore, a slot 212 may be provided in the center plate 206 to accommodate the lever 112.

Figure 8A:
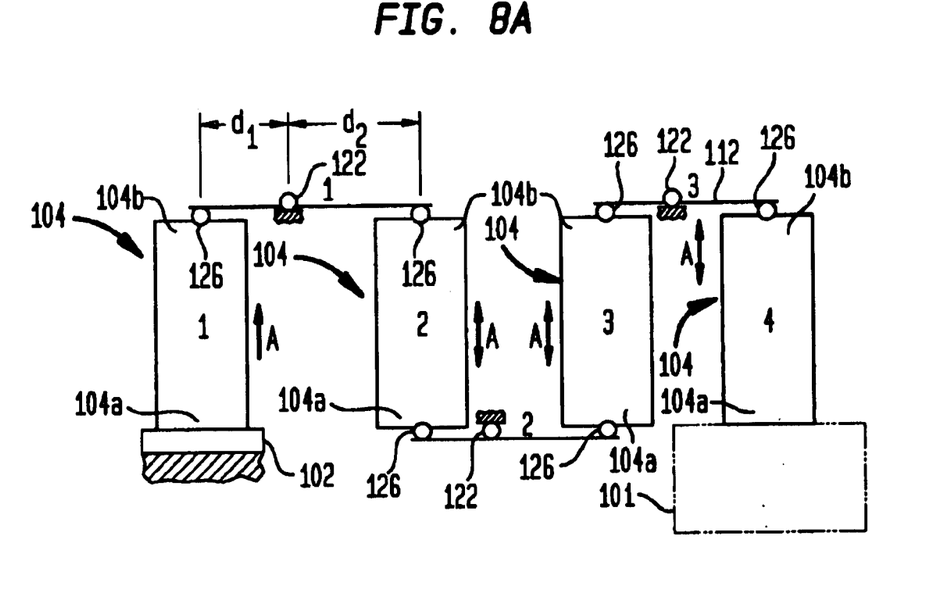
FIG. 8A illustrates a schematic view of an actuator of the present invention having four piezo members and three levers, the actuator being in an un-actuated state.
Figure 8B:
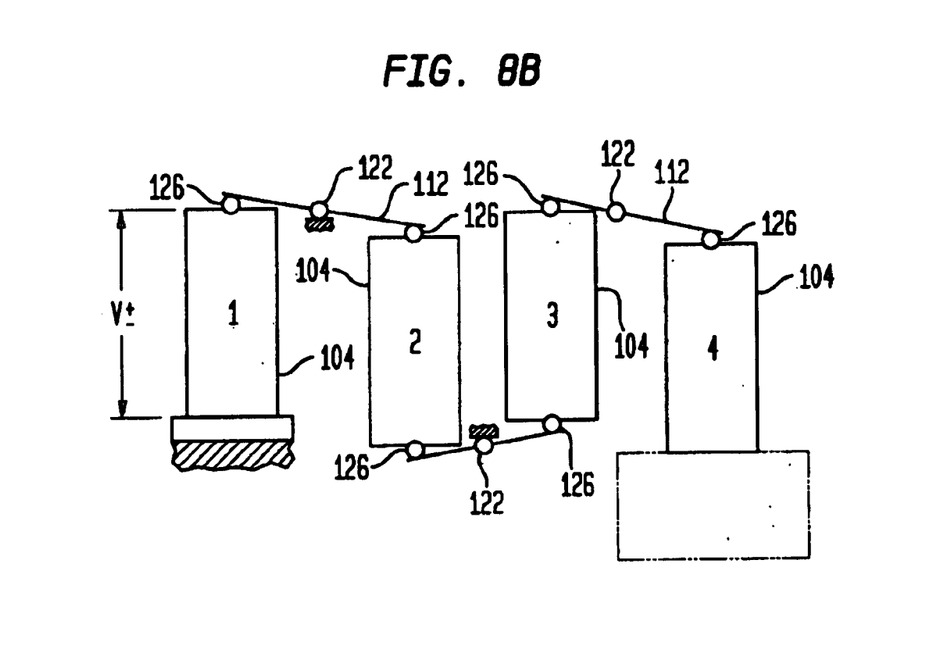
FIG. 8B illustrates the schematic of FIG. 8A in which each of the piezo members are actuated by an actuation voltage.

Referring now to FIGS. 8A and 8B, the operation of an in-line configured actuator having four piezo members 104 will now be described. FIG. 8A schematically shows an actuator in an un-actuated position having four piezo members 104 numbered 1–4 and three levers 112 numbered 1–3. The levers 112 are arranged in an alternating fashion as described above. Furthermore, the levers 112 are rotatable disposed in the body 112 by shaft 122 to provide an amplification the displacement from one piezo member 104 to another and from the last (fourth) piezo member 104 to the actuated device 101. To accomplish the amplification the shaft is positioned off center such that a distance d1 from the first end 112a to the shaft is less than a distance d2 from the second end 112b to the shaft. Preferably d2=2d1, such that the displacement is amplified by a factor of two (with a reduction in the actuating force of ½).

The first piezo member 104 is fixed to the body 102 at the first end 104a thereof. The movement of the remaining piezo members 104 (2–4) is preferably restrained to the direction of arrow A as described above. Referring now to FIG. 8B, upon the application of an actuating voltage V to the piezo members 104, which can be applied individually or together upon closure of a switch (not shown), the piezo members 104 each generate their own force through a displacement. The first piezo member 104 exerts a force through a displacement in the direction of arrow A. The first lever 112 amplifies the displacement from the first piezo member 104 by a factor of d2/d1 and decreases the force from the first piezo member 104 by a factor of d1/d2. The displacement and force of the first and second piezo members is transferred to the third and fourth piezo members 104 according to the same factors, where the displacements are accumulated and also preferably amplified. The fourth piezo member 104 transfers the accumulated displacements and the forces as well as its own displacement and force to output a total force $F_a$ and total displacement d to another device 101, such as a valve to actuate the same. Those skilled in the art will appreciate that if one or less than all of the piezo members 104 fail (i.e., does not generate a displacement and/or force), the actuator will still operate, albeit at a reduced total displacement d.

Referring now to FIGS. 4A and 4b, the operation of the rectangular configuration actuator 200 will now be described. The operation of the actuator 200 is similar to that previously described, however, unlike the in-line configuration shown in FIGS. 8A and 8B where the force and displacement from the piezo members 104 are transferred in a line, in the rectangular configuration shown in FIGS. 3, 4A, and 4B, the force and displacement accumulated at piezo member labeled 2 is transferred to piezo member 104 labeled 3 across the cavities 202, 204 by the lever labeled 3. The force and displacement accumulated at piezo member 104 labeled 3 is then transferred to the piezo member labeled 4 and the total force and displacement is output at the piezo member labeled 4. The previous steps can be repeated as many times (by adding an appropriate number of piezo members and levers) as necessary to achieve the desired final displacement. Those skilled in the art will appreciate that the rectangular configuration can output the same total force and displacement as an in-line actuator having the same number of piezo members 104 in a more compact size.

EXAMPLE

An actuator configured having four piezo members 104 and three levers 112 in an in-line configuration as illustrated in FIGS. 8A and 8B is used as an example. The first piezo member 104 is placed directly on the actuator body 102 and fixed thereto as discussed above. The piezo members 104 are configured such that when voltage is applied to them, they each elongate by 15 micrometers (um). This displacement is amplified by a corresponding lever 112 by a factor G equal to the ratio of the lever arms d1, d2. In the example, the ratio g (also referred to as the gain) is set to be two. This displacement amplification occurs at the expense of the force that will consequently be cut in half (Force× Displacement=Torque is constant on both sides of a lever). The total displacement D achievable in an actuator such as the one in FIGS. 4A and 4B is:

$$D = ax^n + ax^{(n-1)} + \ldots ax + a$$

where D is the maximum total displacement of the system, a is the single maximum displacement of a piezo member 104, x is the single lever 112 gain, and n is the number of levers 112 used in the system. In this example, a=15 um, x=2, n=3; therefore: $D = 15(2)^3 + 15(2)^2 + 15(2) + 15 = 225$ um. Although this displacement is the maximum obtainable under these conditions, it is clear that an infinite number of solutions are possible, as illustrated in Table 1 below. Table 1 shows the lever gain, total actuator gain, and corresponding total displacement for an actuator having 4 piezo members 104 and 3 levers 112, where each of the piezo members have a 15 um maximum displacement when subjected to an actuating voltage V.

TABLE 1

| Lever Gain (NU) | Total Actuator Gain (NU) | Total Displacement (um) |
|---|---|---|
| 1.0 | 4.0 | 60.0 |
| 1.2 | 5.4 | 80.5 |
| 1.4 | 7.1 | 106.6 |
| 1.6 | 9.3 | 138.8 |
| 1.8 | 11.9 | 178.1 |
| 2.0 | 15.0 | 225.0 |
| 2.2 | 18.7 | 280.3 |
| 2.5 | 25.4 | 380.6 |
| 2.6 | 27.9 | 419.0 |
| 2.8 | 33.6 | 503.9 |

TABLE 1-continued

| Lever Gain (NU) | Total Actuator Gain (NU) | Total Displacement (um) |
|---|---|---|
| 3.0 | 40.0 | 600.0 |
| 3.2 | 47.2 | 708.1 |

Figure 9:
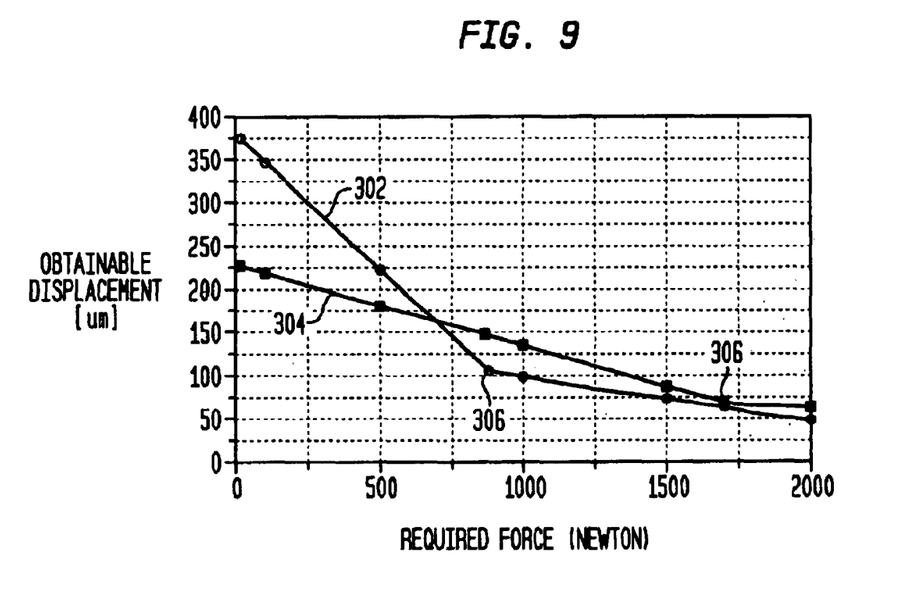
FIG. 9 illustrates a graph of obtainable displacement versus required force for an actuator of the present invention having four piezo members.

Table 2 shows the relation between the Actuation Force F and the total displacement D achievable for two given lever amplifications G in the actuator of FIGS. 8A and 8B. To better visualize this relation, Table 2 is illustrated in graphic form in FIG. 9 where G=2.5 is indicated by reference numeral 302 and G=2 is indicated by reference numeral 304. From the graph in FIG. 9, the advantage of choosing a high gain when a relatively low force is required is evident to those skilled in the art. Very important is to notice the critical points were the first piezo member of the system is stressed to the limit of maximum force and zero displacement; these points are easily identified by the change in slope at reference numeral 306.

TABLE 2

| Actuation Force (N) | Total Displacement (um) G = 2 | Total Displacement (um) G = 2.5 |
|---|---|---|
| 10 | 224 | 377 |
| 100 | 216 | 345 |
| 500 | 178 | 220 |
| 870 | 143 | 102 |
| 1000 | 131 | 95 |
| 1500 | 84 | 70 |
| 1700 | 66 | 59 |
| 2000 | 59 | 44 |
| 3000 | 35 | 28 |
| 3400 | 26 | |
| 5100 | 17 | |
| 6800 | 7.5 | |
| 8500 | 5.6 | |

The actuators here described are especially suitable where low power consumption and relatively small size together with fast actuation are needed. The actuators of the present invention take into account the fact that the piezoelectric effect (dimensional change in crystals subject to voltage) in piezo members 104 (preferably, stacks or bars) produce very high force (as much as 34 Newtons with only 1 mm$^2$ of base area) at very high frequency (greater than 5 Khz). Thus, a single piezo member 104 having a 10×10 mm base area can produce 3,400 Newtons of force. Both of these parameters (Frequency and Force) exceed by far the most demanding conditions for valve actuation. The only severe limitation of the piezo members is the mechanical displacement obtainable from a single piezo member 104 is too small (in the tens of micrometers for a 6 mm high piezo stack) to operate any large flow valve that requires a minimum displacement in the hundreds of micrometers. Taking in consideration the fact that a valve operating at 1000 PSI (687 N/cm$^2$) with a flow of 60 SCFM requires an orifice of about 0.36 cm$^2$, the force needed to operate the valve stem is about 247 Newtons. Thus, it is evident that a single piezo member can provide an overwhelming force (3,400N). If the excess in force is converted into extra displacement, then it is possible to fabricate usable actuators to custom meet most conditions. In the example of FIGS. 8A and 8B, four piezo members 104 are used. This configuration is such that each piezo member 104 transfers its own displacement and force to the next stack through a lever 112 with a fulcrum positioned to give a predetermined displacement gain G. For example, if the gain G of all the levers 112 is set to be two, if the first piezo member moves upward 15 micrometers, the first lever will push downward 30 microns. The second piezo member will add other 15 microns due to its own expansion, pushing 45 microns downward. This ripple effect propagates through the entire system giving a final downward displacement D at the fourth piezo member of 225 micrometers. This displacement is in the useful range for most valve applications.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. An actuator for applying an actuating force through a total displacement, the actuator comprising:
   an actuator body;
   n piezo members supported by the body where n is an integer greater than or equal to two, each of the piezo members generating a force and a displacement upon application of a voltage thereon; and
   n−1 levers rotatably disposed in the body and each having first and second ends corresponding to two of the n piezo members such that the displacements of the n piezo members are accumulated to generate the total displacement at the nth piezo member;
   wherein the body comprises first and second end plates having a pair of aligned bores corresponding to each of the n−1 levers, each of the n−1 levers having a shall rotatably disposed in the pair of aligned bores.

2. The actuator of claim 1, wherein at least one of then piezo members comprises a plurality of sheet elements of a piezo material stacked upon each other to form a piezo stack.

3. The actuator of claim 1, wherein at least one of the n piezo members is a solid bar of a piezo material.

4. The actuator of claim 1, further comprising a rotatable joint between each of the first and second ends of at least one of the n−1 levers and a portion of each corresponding piezo member.

5. The actuator of claim 4, wherein each rotatable joint comprises:
   the piezo member corresponding to the at least one lever having an end portion;
   a cap plate disposed on the end portion, the cap plate having a concavity formed thereon;
   the lever having a concavity formed on one of the first and second ends corresponding to the piezo member; and
   a ball disposed in the concavities of the cap plate and lever for providing a relative rotation therebetween.

6. The actuator of claim 1, wherein at least one of the n−1 levers are rotatably disposed in the body such that the displacement from one of the n piezo members acting on the first end of the at least one of the n−1 levers is amplified at the second end of the at least one of the n−1 levers.

7. The actuator of claim 1, wherein each of the piezo members have corresponding first and second ends and the n−1 levers are disposed in an alternating manner at the first and second ends between adjacent piezo members.

8. An actuator for applying an actuating force through a total displacement, the actuator comprising:
   an actuator body;
   a first piezo member having a first end fixed to the body and a second free end, the first piezo member generating a first force and a first displacement upon application of a first voltage thereon;
   a second piezo member supported in the body and having first and second free ends, the second piezo member generating a second force and a second displacement upon application of a second voltage thereon; and
   a first lever rotatably disposed in the body and having a first end corresponding to the second free end of the first piezo member and a second end corresponding to the second free end of the second piezo member such that the first and second displacements of the first and second piezo members are accumulated to generate the total displacement at the first free end of the second piezo member;
   wherein the body comprises first and second end plates having a pair of aligned bores, the first lever having a shaft rotatably disposed in the pair of aligned bores.

9. The actuator of claim 8, further comprising:
   a third piezo member supported in the body and having first and second free ends, the third piezo member generating a third force and a third displacement upon application of a third voltage thereon; and
   a second lever rotatably disposed in the body and having a first end corresponding to the first free end of the second piezo member and a second end corresponding to the first free end of the third piezo member such that the first, second and third displacements of the first, second and third piezo members are accumulated to generate the total displacement at the second free end of the third piezo member.

10. The actuator of claim 8, wherein the first lever is rotatably disposed in the body such that the displacement from the first piezo member acting on the first end of the first lever is amplified at the second end of the first lever.

11. The actuator of claim 9, wherein the second lever is rotatably disposed in the body such that the displacement from the second piezo member acting on the first end of the second lever is amplified at the second end of the second lever.

12. The actuator of claim 8, wherein at least one of the first and second piezo members comprises a plurality of sheet elements of a piezo material stacked upon each other to form a piezo stack.

13. The actuator of claim 8, wherein at least one of the first and second piezo members is a solid bar of a piezo material.

14. The actuator of claim 8, further comprising a rotatable joint between the first end of the first lever and the second free end of the first piezo member and between the second end of the first lever and the second free end of the second piezo member.

15. The actuator of claim 14, wherein each of the rotatable joints comprises:
   a first cap plate disposed on the second fee end of the first piezo member and a second cap plate disposed on the second free end of the second piezo member, the first and second cap plates having a concavity formed thereon;
   the first and second ends of the first lever having a concavity formed thereon and corresponding to the concavity on the first and second cap plates; and
   a first ball disposed in the concavities of the first cap plate and the first end of the first lever and a second ball disposed in the concavities of the second cap plate and second end of the first lever.

16. The actuator of claim 9, further comprising a rotatable joint between the first end of the first lever and the second free end of the first piezo member, between the second end of the first lever and the second free end of the second piezo member, between the first end of the second lever and the first free end of the second piezo member, and between the second end of the second lever and the first free end of the third piezo member.

17. An actuator for applying an actuating force through a total displacement, the actuator comprising:

an actuator body;

n piezo members supported by the body where n is an integer greater than or equal to two, each of the piezo members generating a force and a displacement upon application of a voltage thereon;

n−1 levers rotatably disposed in the body and each having first and second ends corresponding to two of then piezo members such that the displacements of then piezo members are accumulated to generate the total displacement at the nth piezo member; and a rotatable joint between each of the first and second ends of at least one of the n−1 levers and a portion of each corresponding piezo member, wherein each rotatable joint comprises:

the piezo member corresponding to the at least one lever having an end portion;

a cap plate disposed on the end portion, the cap plate having a concavity formed thereon;

the lever having a concavity formed on one of the first and second ends corresponding to the piezo member; and a ball disposed in the concavities of the cap plate and lever for providing a relative rotation therebetween.

* * * * *